United States Patent [19]

Nguyen et al.

[11] Patent Number: 5,065,303
[45] Date of Patent: Nov. 12, 1991

[54] TRANSFORMER-COUPLED AND PHASE-SHIFTED INVERTER

[75] Inventors: Vietson M. Nguyen; Chai-Nam Ng, both of Rockford, Ill.

[73] Assignee: Sundstrand Corporation, Rockford, Ill.

[21] Appl. No.: 556,452

[22] Filed: Jul. 24, 1990

[51] Int. Cl.$^5$ ............................................. H02M 7/48
[52] U.S. Cl. ........................................ 363/40; 363/71
[58] Field of Search .................................... 363/39–40, 363/64, 71, 131, 132, 135, 136, 137

[56] References Cited

U.S. PATENT DOCUMENTS

| | | | |
|---|---|---|---|
| 3,876,923 | 4/1975 | Humphrey et l. | 321/27 R |
| 3,979,662 | 9/1976 | Klein | 363/71 |
| 4,204,264 | 5/1980 | Lipman | 363/71 |
| 4,225,914 | 9/1980 | Hirata et al. | 363/160 |
| 4,268,900 | 5/1981 | Hirata | 363/71 |
| 4,366,532 | 12/1982 | Rosa et al. | 363/69 |
| 4,698,739 | 10/1987 | Paice | 363/71 |

*Primary Examiner*—Peter S. Wong
*Attorney, Agent, or Firm*—Antonelli, Terry, Stout & Kraus

[57] ABSTRACT

A power system in accordance with the present invention includes a first inverter and a second inverter, a first transformer having a primary coupled to an output of the first inverter and a secondary coupled only magnetically to the primary of the first transformer; a second transformer having a primary coupled to the output of the second inverter and a secondary coupled only magnetically to the primary of the second transformer; a controller and a number of series circuits equal to the number of phases, each series circuit comprising the secondary windings of a corresponding phase of each transformer with a first terminal of each series circuit being coupled to a reference potential and a second terminal being a phase output for the power system.

25 Claims, 3 Drawing Sheets

TRANSFORMER-COUPLED AND
PHASE-SHIFTED INVERTER

DESCRIPTION

1. Technical Field

The present invention relates to power systems having inverters operated in parallel with corresponding phases of the inverters operated with a predetermined phase shift for purposes of cancelling harmonics. More particularly, the present invention relates to power systems of the foregoing type which produce AC and DC power with reduced harmonics in the AC power.

2. Background Art

FIG. 1 illustrates a prior art AC power generating system 10 having a pair of inverters 12 and 14 which respectively produce AC power with a predetermined phase shift between corresponding phases. Each phase has a fundamental sinusoidal frequency which may be 400 Hz. used in airframe applications. The first inverter 12 and the second inverter 14 are of identical construction. Each inverter has three output phases 16, 18, and 20. Each output phase 16-20 is produced by a pair of switches 22 and 24 which may be any power switch such as a bipolar transistor or thyristor. The first switch 22 of each phase is connected between a positive DC rail 26 and a junction point 28 which is the output for the phase. The second switch 24 is connected between the junction point 28 and the negative side of the DC bus. Switching signals identified by reference numerals 1-12 are respectively applied to a different control terminal of each of the switches 22 and 24 by a controller 32. The control signals provided by the controller 32 may be pulse width modulated to produce the fundamental frequency AC and to provide voltage regulation. The controller 32 pulse width modulates the time duration during which each of the switches 22 and 24 is turned on a plurality of times during each cycle of the primary AC frequency produced by each of the inverters 12 and 14 in a known manner.

The two inverters 12 and 14 are operated in parallel with the predetermined phase shift to produce increased output power in the phase outputs 16-20 and to cancel undesired harmonics which are produced by the inverters. The controller 32 phase displaces the time during which the switches 22 and 24 of each phase of inverters 12 and 14 are turned on with respect to the corresponding phase of the other inverter to produce a predetermined phase shift between the phases for purposes of cancelling undesired harmonics. For example, if a high energy content is present in a fifth or seventh harmonic of the fundamental frequency produced by each of the inverters 12 and 14, a phase shift of 30° between the respective output phases 16-20 of each of the inverters 12 and 14 will cause substantial cancellation of the fifth and seventh harmonics as a result of the phase shift of the fifth and seventh harmonic being respectively 150° and 210° between the respective output phases 16-20 when applied to the interphase transformer 34 as discussed below. An interphase transformer 34 combines each of the corresponding output phases 16-20 from the inverters 12 and 14 to cause an addition of the fundamental frequency AC produced by the inverters which is vectorially added by the interphase transformer 34 to produce the desired output fundamental frequency and further causes the aforementioned cancellation of undesired harmonics. Each output phase 16-20 is connected to opposite terminals 36 and 38 of the phase windings of interphase transformer 34. The phase output from each of the phases from the interphase transformer 34 is produced by a center tap 40. The center taps 40 from the interphase transformer 34 respectively drive a different electrical load 44 of the three phase electrical load 42. A neutral N returns current from a unbalanced load to the junction of a pair of capacitors 41 connected between the DC rails 26 and 30. The cancellation of harmonics by phase shifting corresponding output phases of inverters and combining the corresponding output phases reduces the size of filters required to reduce harmonics when compared to the size of filters required to remove the same quantity of harmonic power from a single inverter.

The power system 10 is not suitable for producing a combination of AC and DC power which is required in hybrid applications such as airframes. Hybrid AC and DC power systems have been proposed in airframes having 270 volt DC and further generating 400 Hz. Groundings are required on both AC and DC buses of a hybrid power system. AC produced by inverters driven by the 270 volt DC is used to drive selected AC loads. It is necessary that 270 volt DC power in an airframe have as small as possible ripple and that 400 Hz. AC power in an airframe have as small as possible harmonics as a consequence of the prevalence of electrical loads containing sophisticated electronics. The interphase transformer 34 has the disadvantage of saturating with high DC current leading to a potentially disastrous shoot through condition.

AC power systems using inverters operated in parallel with a predetermined phase shift analogous to the operation of the prior art system of FIG. 1 are known. Systems which operate inverters with a predetermined phase shift are disclosed in U.S. Pat. Nos. 3,876,923; 4,225,914; 4,268,900; and 4,698,739.

DISCLOSURE OF THE INVENTION

The present invention is a power system which provides AC power having reduced harmonics from a plurality of inverters operated with corresponding phases displaced with a predetermined phase shift which does not utilize the interphase transformer of the prior art. With the invention corresponding phases of parallel connected inverters operated with a predetermined phase shift are combined in a series circuit. Each series circuit contains secondary windings of corresponding phases of transformers with each transformer respectively having primary windings driven by a different inverter to cancel undesired harmonics in a manner analogous to the prior art. The inductive coupling between the secondary and primary inductive coupling between the secondary and primary windings of the transformers eliminates any DC current flowing in the AC output. The two inverters are isolated from each other by means of using the transformers thus preventing the possibility of shoot through as in the prior art. As a consequence of preventing the possibility of shoot through, the DC source may be utilized in the aforementioned hybrid AC-DC power system for airframes in which regulation of the 270 volt DC source is of extreme importance. Furthermore, the primary and secondary windings of the transformers provide leakage inductance which further attenuates undesired harmonics in the AC phase outputs produced by combining the output phases of the inverters operated with a predetermined phase shift to further reduce harmonics and lessen the need for additional filtering. Furthermore, as in the prior art of FIG. 1, the combining of the output phases of plural parallel connected inverters with the series connected secondary windings of transformers reduces the size and weight of filters necessary to attenuate harmonics with respect to the size and weight of the filters used when only a single inverter was used to produce each AC phase output of the AC power system.

A power system in accordance with the present invention includes a first inverter having plurality of switches which are switched between on and off states by control signals applied to switch control terminals to produce at least one output phase; a second inverter having a plurality of switches which are switched between on and off states by control signals applied to phase; a first transformer having a primary coupled to each output phase of the first inverter with a number of primary windings equal to a number of output phases produced by the inverters and each primary winding of the first transformer coupled to a different output phase of the first inverter and a secondary coupled only magnetically to the primary of the first transformer with a number of secondary windings equal to the number of primary windings and each secondary winding coupled to different primary winding; a second transformer having a primary coupled to each output phase of the second inverter with a number of primary windings equal to the number of output phases produced by the inverters and each primary winding of the second transformer coupled to a different output phase of the second inverter and a secondary coupled only magnetically to the primary of the second transformer with a number of secondary windings of the second transformer being equal to the number of primary windings of the second transformer and each secondary winding coupled to different primary winding; a controller producing the control signals for the switches which cause a fundamental frequency of alternating current produced by each phase of the first inverter to be phase displaced from a corresponding fundamental frequency of AC produced by each phase of the second inverter by a predetermined phase displacement; and a number of series circuits equal to a number of phase outputs of the system, each series circuit comprising the secondary windings of a corresponding phase of each transformer coupled to a different phase output with a first terminal of each series circuit being coupled to a reference potential and a second terminal being a phase output of the power system. The power system has three phases. The primary windings of the transformers are each connected in a delta configuration or alternatively are each connected in a star configuration. A pair of DC potentials are coupled to the inverters which are switched by the switches and produce a regulated DC output with one of the DC potentials being connected to the reference potential. The DC output and the phase outputs are respectively connected to electrical loads in an airframe powered by DC and AC and the reference potential is a neutral. The controller pulse width modulates the control signals applied to the switches to maintain a regulated potential in the phase outputs of the system while maintaining the predetermined phase shift to cancel undesired harmonics.

In an electrical power system having first and second inverters which each produce at least one output phase, corresponding phase outputs each having a predetermined phase displacement that are combined for cancelling harmonics of a fundamental frequency of AC from a phase output, an improvement in accordance with the invention includes a first transformer having a number of primary windings equal in number to a number of output phases, each primary winding being coupled to a different output phase of the first inverter and a number of secondary windings being equal to a number of primary windings, each secondary winding being coupled magnetically to a different primary winding of the first transformer; a second transformer having a number of primary windings equal in number to a number of of primary windings equal in number to a number of output phases, each primary winding being coupled to a different output phase of the second inverter and a number of secondary windings being equal to a number of primary windings, each secondary winding being coupled only magnetically to a single primary winding of the second transformer; and a number of series circuits being equal to a number of output phases of the system, each series circuit comprising secondary windings from a corresponding phase of each transformer coupled to a different phase output with a first terminal of each series circuit being coupled to a reference potential and a second terminal being a phase output of the power system. The power supply has three phase outputs. The primary of the transformers are each connected in a delta configuration or a star configuration. A pair of DC potentials are coupled to the inverter for providing DC potentials which are switched by switches of the inverter to produce the AC and a regulated DC output with one of the DC potentials being connected to the reference potential and wherein the reference potential is ground in an airframe and is a neutral coupled to the phase outputs of the power system.

BEST MODE FOR CARRYING OUT THE INVENTION

Figure 1:
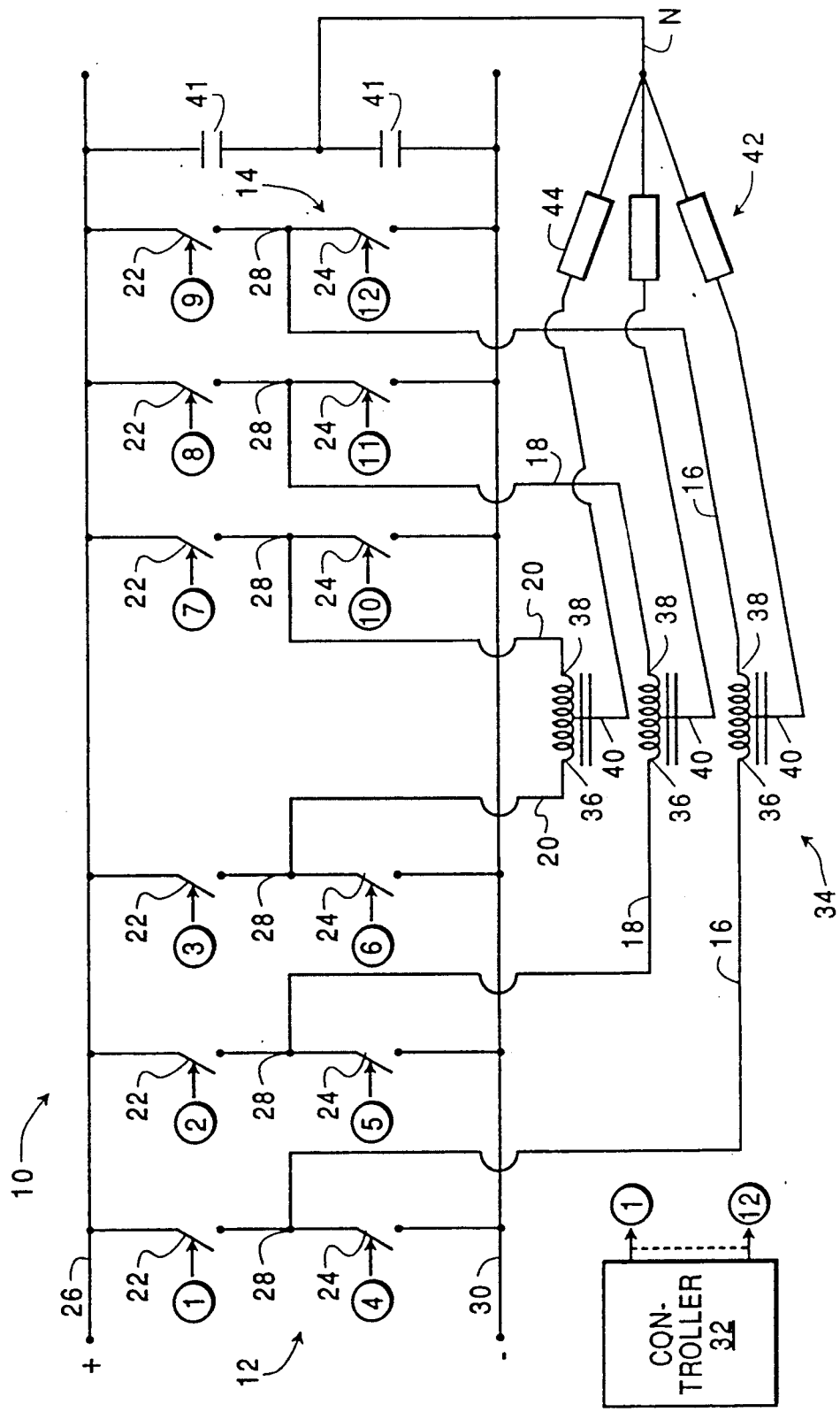
FIG. 1 illustrates a prior art power supply having a pair of inverters producing output phases which have a predetermined phase displacement for cancelling undesired harmonics with an interphase transformer.
Figure 2:
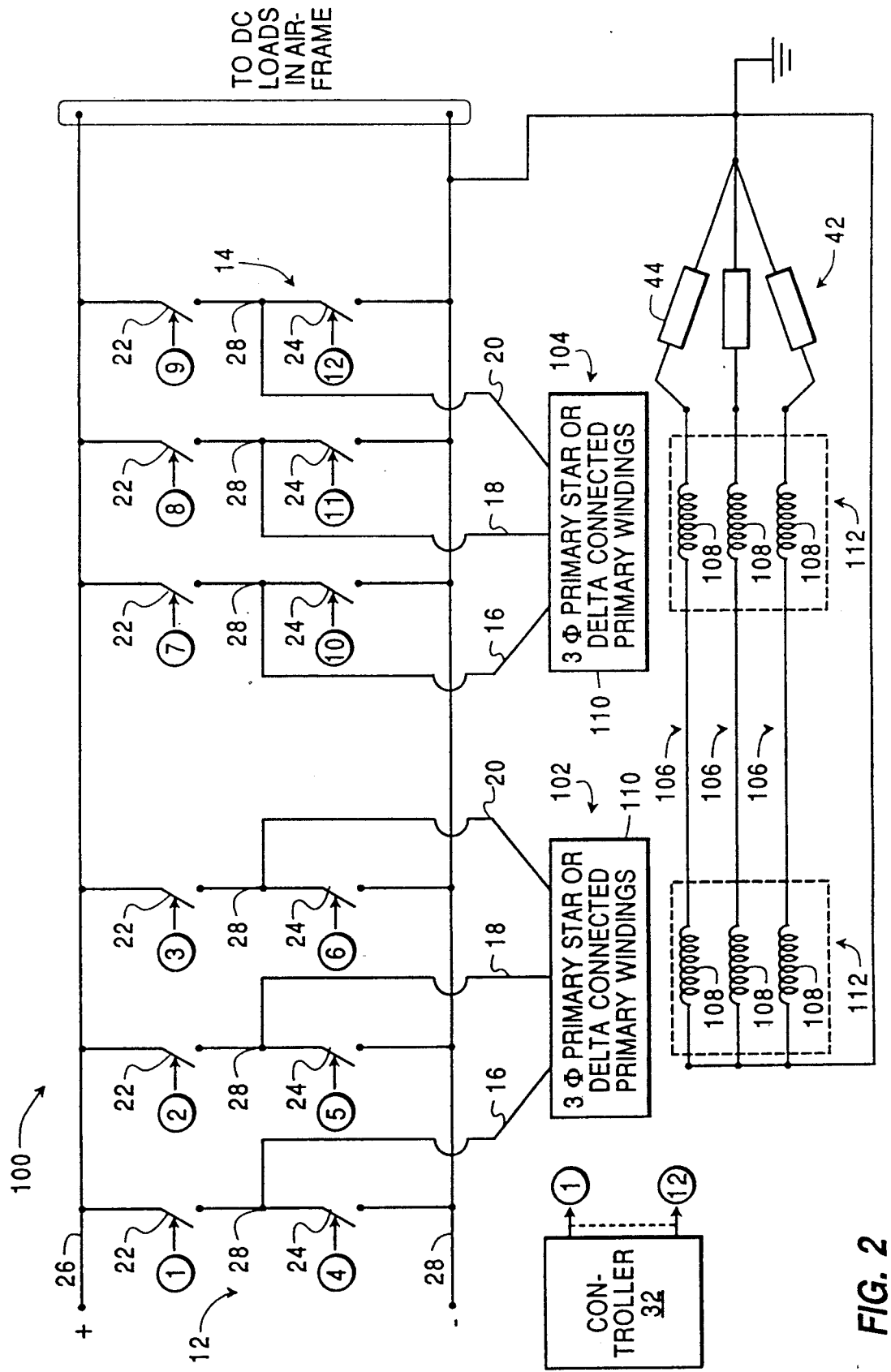
FIG. 2 illustrates an embodiment of the present invention.

FIG. 2 illustrates a hybrid power supply 100 in accordance with the present invention. Identical parts are identified by like reference numerals in FIGS. 1 and 2. The present invention differs from the prior art of FIG. 1 in that the interphase transformer 34 of the prior art has been replaced with a pair of transformers 102 and 104 coupled to identical series circuits 106 equal in number to the number of phase outputs produced by the power system. Each series circuit is comprised of secondary windings 108 of corresponding phases of the transformers 102 and 104 to produce cancellation of undesired harmonics while eliminating the currents producing shoot through as in the interphase transformer 34 of the prior art. Each transformer 102 and 104 is identical and magnetically couples a secondary winding 108 associated with a particular phase output of the power system with a primary winding associated with a corresponding output phase of one of the inverters 12 and 14. When the inverters 12 and 14 are producing three phase AC, the primaries 110 of the transformers 102 and 104 may be connected in a known star or delta connection of the phase outputs 16–20. The star or delta connection of the output phases 16–20 produced by the inverters 12 and 14 has not been illustrated for the purpose of simplifying the illustration and as a consequence of it being known. The secondary 112 is comprised of a number of secondary windings equal to the number of output phases produced by the inverters 12 and 14. The three secondary windings 108 of each transformer 102 and 104 are respectively coupled magnetically to a different primary winding within the star or delta connected primary 110. Each series circuit 106 is comprised of secondary windings of the transformers 102 and 104 of a corresponding phase with a first terminal being coupled to a reference potential and a second terminal being a different phase output $\phi A$–$\phi C$. The first terminal may be connected to other points in the power supply 100 as a consequence of the isolation provided by the transformer. Each of the individual electrical phase loads 44 of the three phase load 42 are connected to a different series circuit 106 and to a reference potential. The DC rails 26 and 30 comprise a regulated DC potential of the type which may be used to drive a DC power bus in proposed 270 volt DC power systems for airframes without being overloaded by the inverters for producing the AC phase outputs $\phi A$–$\phi C$.

Figure 3:
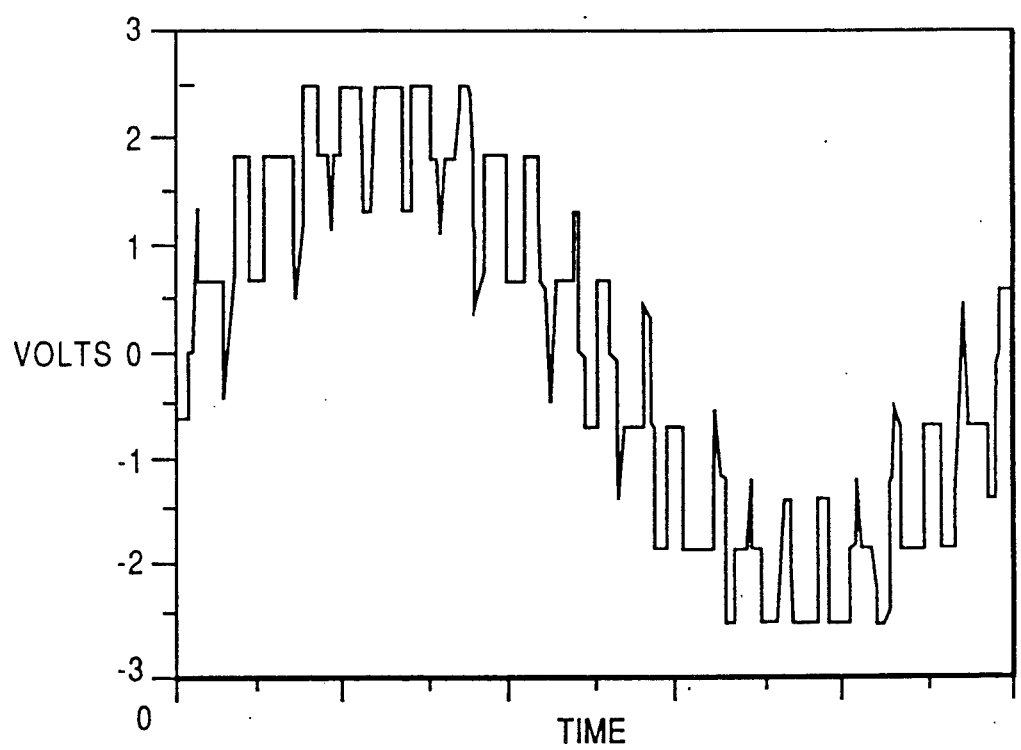
FIG. 3 illustrates a simulated waveform resultant from the present invention with harmonics cancelled.

The embodiment 100 operates as follows. Each of the inverters 12 and 14 have the switches 22 and 24 of each phase pulse width modulated to produce a phase output to maintain a regulated potential and a predetermined phase displacement between corresponding output phases 16–20 produced by the inverters. The maintaining of the predetermined phase displacement results in undesired harmonics produced respectively by the inverters 12 and 14 being shifted by a phase angle approaching 180°. The series circuits 106, which are each comprised of corresponding secondary phase windings 108 of transformers 102 and 104, cancel the undesired harmonics. When a predetermined phase displacement of 30° is maintained between the output phases 16–20 from the inverters 12 and 14, undesired harmonics such as the fifth and seventh are cancelled as a consequence of the 150° and 210° phase displacement respectively between the fifth and seventh harmonics produced respectively by the inverters 12 and 14. Phase cancellation occurs as a consequence of the addition of the phase displaced harmonics in the series circuits 106 in a manner analogous to the prior art of FIG. 1. FIG. 3 illustrates a simulated phase to neutral waveform with 6 pulses per cycle produced by a 12 step inverter in accordance with the present invention with undesired harmonics cancelled. The inductive coupling between the primary and secondary windings prevents undesired DC currents and prevents shoot through DC currents from flowing in the primary which makes the prior art circuit of FIG. 1 undesirable for airframe applications. As illustrated the individual electrical loads 44 are electrical loads present in an airframe.

While the invention has been described in terms of its preferred embodiment, it should be understood that numerous modifications made be made thereto without departing from the spirit and scope of the invention as defined in the appended claims. For example while the inverters 12 and 14 are illustrated as producing three phase AC output power, it should be understood that the invention may be practiced with any number of phases produced by two or more inverters with cancellation of undesired harmonics occurring in series circuits comprised of corresponding secondaries of transformers having primaries respectively coupled to different inverters.

We claim:

1. A power system comprising:
   a first inverter having a plurality of switches which are switched between on and off states by control signals applied to switch control terminals to produce at least one output phase;
   a second inverter having a plurality of switches which are switched between on and off states by control signals applied to switch control terminals to produce at least one output phase;
   a first transformer having a primary coupled to each output phase of the first inverter with a number of primary windings equal to a number of output phases produced by the first inverter and each primary winding of the first transformer being coupled to a different phase output of the first inverter and a secondary coupled only magnetically to the primary of the first transformer with a number of secondary windings being equal to the number of primary windings and each secondary winding being coupled to a different primary winding;
   a second transformer having a primary coupled to each output phase of the second inverter with a number of primary windings equal to the number of output phases produced by the first inverter and each primary winding of the second transformer being coupled to a different phase output of the second inverter and a secondary coupled only magnetically to the primary of the second transformer with a number of secondary windings of the second transformer being equal to the number of primary windings of the second transformer and each secondary winding being coupled to a different primary winding;
   a controller producing the control signals for the switches which cause a fundamental frequency of alternating current produced by each phase of the first inverter to be phase displaced from a corresponding fundamental frequency of alternating current produced by each phase of the second inverter by a predetermined phase displacement; and
   a number of series circuits equal to the number of phases, each series circuit comprising secondary windings from a corresponding phase of each transformer coupled to a different phase output with a first terminal of each series circuit being coupled to a reference potential and a second terminal being a phase output for the power system.

2. A power system in accordance with claim 1 wherein:
   the power supply three phase outputs.

3. A power system in accordance with claim 2 wherein:
   the primary windings of the transformers are connected in a delta configuration.

4. A power system in accordance with claim 2 wherein:
   the primary of the transformers are each connected in a star configuration.

5. A power system in accordance with claim 1 further comprising:
   a pair of DC potentials coupled to the inverters for providing the DC potentials which are switched by the switches and a regulated DC output with one of the DC potentials being connected to the reference potential.

6. A power system in accordance with claim 2 further comprising:
a pair of DC potentials coupled to the inverters for providing the DC potentials which are switched by the switches and a regulated DC output with one of the DC potentials being connected to the reference potential.

7. A power system in accordance with claim 3 further comprising:
a pair of DC potentials coupled to the inverters for providing the DC potentials which are switched by the switches and a regulated DC output with one of the DC potentials being connected to the reference potential.

8. A power system in accordance with claim 4 further comprising:
a pair of DC potentials coupled to the inverters for providing the DC potentials which are switched by the switches and a regulated DC output with one of the DC potentials being connected to the reference potential.

9. A power system in accordance with claim 5 wherein:
the regulated DC and each output phase are respectively connected to electrical loads in an airframe which are powered by DC and AC and the reference potential is a neutral.

10. A power system in accordance with claim 6 wherein:
the regulated DC and each output phase are respectively connected to electrical loads in an airframe which are powered by DC and AC and the reference potential is a neutral.

11. A power system in accordance with claim 7 wherein:
the regulated DC and each output phase are respectively connected to electrical loads in an airframe which are powered by DC and AC and the reference potential is a neutral.

12. A power system in accordance with claim 8 wherein:
the regulated DC and each output phase are respectively connected to electrical loads in an airframe which are powered by DC and AC and the reference potential is a neutral.

13. A power system in accordance with claim 5 wherein:
the controller pulse width modulates the control signals applied to the switches to maintain a regulated potential of each phase output of the system while maintaining the predetermined phase displacement to cancel undesired harmonics.

14. A power system in accordance with claim 6 wherein:
the controller pulse width modulates the control signals applied to the switches to maintain a regulated potential of each phase output of the system while maintaining the predetermined phase displacement to cancel undesired harmonics.

15. A power system in accordance with claim 7 wherein:
the controller pulse width modulates the control signals applied to the switches to maintain a regulated potential of each phase output of the system while maintaining the predetermined phase displacement to cancel undesired harmonics.

16. A power system in accordance with claim 8 wherein:
the controller pulse width modulates the control signals applied to the switches to maintain a regulated potential of each phase output of the system while maintaining the predetermined phase displacement to cancel undesired harmonics.

17. A power system in accordance with claim 9 wherein:
the controller pulse width modulates the control signals applied to the switches to maintain a regulated potential of each phase output of the of the system while maintaining the predetermined phase displacement to cancel undesired harmonics.

18. A power system in accordance with claim 10 wherein:
the controller pulse width modulates the control signals applied to the switches to maintain a regulated potential of each phase output of the system While maintaining the predetermined phase displacement to cancel undesired harmonics.

19. A power supply in accordance with claim 11 wherein:
the controller pulse width modulates the control signals applied to the switches to maintain a regulated potential of each phase output of the of the system while maintaining the predetermined phase displacement to cancel undesired harmonics.

20. A power system in accordance with claim 12 wherein:
the controller pulse width modulates the control signals applied to the switches to maintain a regulated potential of each phase output of the system while maintaining the predetermined phase displacement to cancel undesired harmonics.

21. In an electrical power system having first and second inverters which produce at least one output phase, corresponding phase outputs having a predetermined phase displacement that are combined for cancelling harmonics of a fundamental frequency of AC from a phase output, the improvement comprising:
a first transformer having a number of primary windings equal in number to a number of output phases, each primary windings being coupled to a different output phase of the first inverter and a number of secondary windings being equal to a number of primary windings, each secondary winding being coupled only magnetically to a different primary winding of the first transformer winding;
a second transformer having a number of primary windings equal in number to a number of output phases, each primary windings being coupled to a different output phase of the second inverter and a number of secondary windings being equal to a number of primary windings, each secondary winding being coupled only magnetically to a different primary winding of the second transformer; and
a number of series circuits equal to a number of the output phases of the system, each series circuit comprising secondary windings from a corresponding phase of each transformer coupled to a different phase output with a first terminal of each series circuit being coupled to a reference potential and a second terminal being a phase output of the power system.

22. A power system in accordance with claim 21 wherein:

the power system has three phase outputs.

23. A power generating system in accordance with claim 21 wherein:

the primary windings of each transformer are connected in a delta configuration.

24. A power generating system in accordance with claim 21 wherein:

the primary windings of each transformer are connected in a star configuration.

25. A power generating system in accordance with claim 21 further comprising:

a pair of DC potentials coupled to the inverters for providing DC potentials which are switched by switches of the inverters to produce AC and a regulated DC output with one of the DC potentials being connected to the reference potential; and wherein the reference potential is ground in an airframe and is a neutral coupled to the phase outputs of the power system.

* * * * *